US009456322B1

(12) United States Patent
Charugundla

(10) Patent No.: US 9,456,322 B1
(45) Date of Patent: Sep. 27, 2016

(54) PAGING SYSTEM

(71) Applicant: Kent S. Charugundla, New York, NY (US)

(72) Inventor: Kent S. Charugundla, New York, NY (US)

(73) Assignee: C21 Patents, LLC, New York, NY (US)

( * ) Notice: Subject to any disclaimer, the term of this patent is extended or adjusted under 35 U.S.C. 154(b) by 0 days.

(21) Appl. No.: 14/985,082

(22) Filed: Dec. 30, 2015

(51) Int. Cl.
*H04W 4/00* (2009.01)
*H04W 4/14* (2009.01)

(52) U.S. Cl.
CPC ....................................... *H04W 4/14* (2013.01)

(58) Field of Classification Search
CPC ......................... H04W 88/185; H04W 84/022
USPC ..................... 455/575, 426.1, 458
See application file for complete search history.

(56) References Cited

U.S. PATENT DOCUMENTS

| | | | | |
|---|---|---|---|---|
| 5,317,621 A * | 5/1994 | Shibayama | ......... | H04W 88/023 340/7.53 |
| 6,434,385 B1 * | 8/2002 | Aucoeur | ............ | H04B 7/18567 455/12.1 |
| 8,320,891 B1 * | 11/2012 | Delker | .............. | H04M 1/72552 455/405 |
| 2006/0209805 A1 * | 9/2006 | Mahdi | ................. | H04L 12/6418 370/352 |
| 2007/0081640 A1 * | 4/2007 | Jachner | ............. | H04M 3/53366 379/88.16 |
| 2011/0310794 A1 * | 12/2011 | Jang | .................... | H04M 7/1235 370/328 |
| 2014/0106719 A1 * | 4/2014 | Chitre | ................. | H04W 76/007 455/414.1 |
| 2014/0194111 A1 * | 7/2014 | Aso | ....................... | H04W 4/001 455/419 |
| 2015/0271326 A1 * | 9/2015 | Matlock | ............... | H04M 3/436 705/14.58 |

* cited by examiner

*Primary Examiner* — Charles Appiah
*Assistant Examiner* — Edward Zhang
(74) *Attorney, Agent, or Firm* — Paul J. Sutton; Barry G. Magidoff

(57) ABSTRACT

A paging system that allows a paging device to page a pager via a signaling channel of a communication network to which the pager is coupled. An alerting server that is part of the paging system receives a paging request from the paging device and converts the paging request to a paging message that is then transmitted over the signaling channel to the pager device. In response to the paging message, the pager device transmits a contact message indicating reception of the paging message and starts a timer for a defined time period during which the pager device is to transmit an acknowledgment message over the signaling channel to the alerting server which informs the paging device that the page has been properly received.

12 Claims, 5 Drawing Sheets

PAGING SYSTEM

BACKGROUND

1. Field of the Disclosure

The present disclosure generally relates to communication systems and more particularly to communication systems for paging.

2. Description of Related Art

This section is a discussion intended to provide a better understanding of the disclosure herein, but makes no claim nor implies as to what is the relevant prior art for this disclosure.

With the advent of cellular communication technology, the use of paging systems and pager devices has virtually disappeared. Cellular phones have become a staple for communication systems in virtually all cultures and communities throughout the world. Similar to pagers a few decades ago, cellular phones are usually carried by their users virtually at all times. Thus, for the most part, one can simply dial the number of a cellular phone in order to contact its user. Pagers and Paging systems were part of relatively low complexity wireless systems when compared to cellular systems of today. While cellular wireless systems provide much more sophisticated services and features compared to paging systems, there is still a need for paging systems as many times cellular networks become temporarily nonoperational for a variety of reasons rendering cellular phones subscribed to such networks useless during such system outages.

SUMMARY

The present disclosure is a paging system comprising at least one Alerting Server and a pager device. The server and the pager device communicate with each other over a signaling channel of a communication network to which the paging device and Alerting server are coupled.

The server of the paging system comprises a processor, a transmitter and receiver circuitry coupled to the processor. Under the control of the processor a proper paging request received by the receiver circuitry is converted to a paging message comprising a telephone number of a paging device from which the paging request was received. The processor controls the transmitter to transmit the paging message over a signaling channel of a communication network to which the server is coupled.

In one embodiment, the server further comprises an antenna coupled to the transmitter and receiver circuitry where said antenna is configured to communicate with a satellite communication network.

In another embodiment, the server further comprises a text processing and protocol module coupled to the processor for processing incoming and outgoing text signals and formatting such signals in accordance with a protocol being followed by the signaling channel.

In yet another embodiment, the server further comprises a Memory coupled to the processor, the Memory has stored therein pre-defined messages and protocols used by the server to communicate in text or voice with user devices and other communication networks.

In yet another embodiment, the server further comprises an IVR system coupled to the processor, the IVR system being used for communicating with a paging device during a paging request.

In yet another embodiment, the server further comprises an IVR system coupled to the processor, the IVR system being used to report status of a pager device to a paging device after a paging request was sent by the paging device.

In yet another embodiment, the server further comprises an IVR system coupled to the processor, the IVR system being used to generate synthesized voice prompts to direct entry of a code associated with the pager device.

The pager device of the paging system comprises a processor, a memory coupled to the processor, and transmit and receive circuitry coupled to and operated by the processor for transmitting a contact message in response to the transmit and receive circuitry receiving a paging message over a signaling channel of a communication network to which the pager device is coupled, and the processor operates an Input/Output (I/O) interface circuit coupled to obtain an acknowledgement transmitted over the signaling channel where the acknowledgement message is generated from one of a plurality of user accessible components coupled to the I/O interface circuit.

In one embodiment, the pager device further comprises a first antenna and a second antenna for communicating with a wireless communication network and a satellite communication network respectively.

In another embodiment of the pager device, the contact message is stored in the memory.

In yet another embodiment of the pager device, a signaling protocol of the communication network is stored in the memory.

In yet another embodiment of the pager device, the acknowledgement message is one of a voice message, a text message and an acknowledgement response formatted in accordance with a protocol being followed by the signaling channel.

In yet another embodiment of the pager device, after the contact message is sent, the processor starts a timer for a defined period of time during which the acknowledgement message stored in the memory is caused by the processor to be transmitted over the signaling channel.

A method performed by the server of the paging system, comprises the steps of converting, by a processor of the server, a proper page request received from a paging device to a paging message comprising a telephone number of the paging device where the processor of the server causes the paging message to be transmitted over a signaling channel of a communication network to which the server is coupled.

In one embodiment of the method performed by the server, an IVR system of the server confirms the telephone number of the paging device generating the page request and confirms correct voice entry of an N-digit code associated with a pager device being paged, where N is an integer equal to 2 or greater.

In another embodiment of the method performed by the server, a text processing and protocol module of the server confirms the telephone number of the paging device generating the page request and confirms correct entry in text format of an N-digit code for a pager device being paged, where N is an integer equal to 2 or greater.

In yet another embodiment of the method performed by the server, the signaling channel operates in accordance with a USSD protocol.

In yet another embodiment of the method performed by the server, the signaling channel operates in accordance with an SMPP protocol.

In yet another embodiment of the method performed by the server an additional step comprises informing the paging device using synthesized voice generated by an IVR of the server or using a text message generated by a text processing and protocol module that an acknowledgement message was received from a pager device indicating a successful page.

A method performed by a pager device of a paging system, comprises transmitting an acknowledgement message over a signaling channel in response to a paging message received via the signaling channel of a communication system to which the pager device is coupled.

In one embodiment of the method performed by the pager device, the paging message is displayed by a display of the pager device.

In another embodiment of the method performed by the pager device, the pager device transmits a contact message over the signaling channel in response to receiving the paging message.

In yet another embodiment of the method performed by the pager device, after the contact message is transmitted, the pager device sets a timer to run for a defined period of time during which time the acknowledgement message is to be transmitted.

In yet another embodiment of the method performed by the pager device, the acknowledgement message includes one of a voice message and a text message transmitted by the pager device resulting from operation of one or more user accessible components of the pager device.

BRIEF DESCRIPTION OF THE DRAWINGS

The understanding of the present disclosure and its numerous features and advantages are facilitated for those skilled in the relevant art of this disclosure by referring to the accompanying drawings. Reference numerals and/or symbols are used in the drawings. The use of the same reference in different drawings indicates similar or identical components, devices or systems. Various other aspects of this disclosure, its benefits and advantages may be better understood from the Detailed Description herein and the accompanying drawings described as follows.

DETAILED DESCRIPTION

Figure 1:
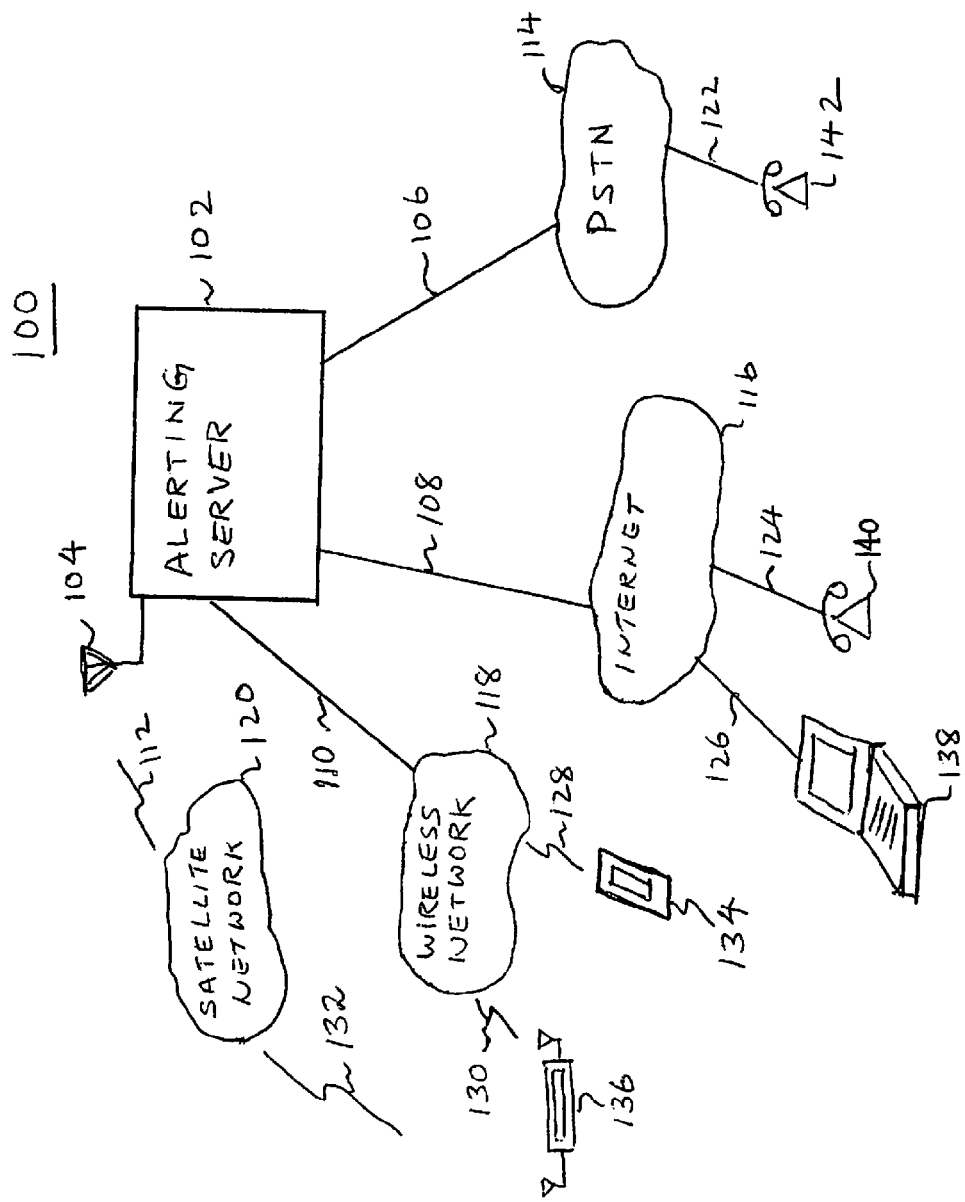
FIG. 1 shows an Alerting Server of the paging system of this disclosure coupled to several communication networks including a satellite network.

Referring to FIG. 1, there is shown an Alerting Server 102 (described in detail herein below) coupled to various communication networks 114, 116, 118 and 120 via respective communication links 106, 108, 110 and 112 thus forming communication system 100. Each of the communication links (106, 108, 110, 112) is shown as one continuous link or connection between two different networks. It should be noted however that each of the communication links may comprise various communication equipment that enable the transmission and reception (or both transmission and reception simultaneously or at different times) of communication signals between the Alerting Server 102 and the different networks. Further, the communication links may be implemented with various media including but not limited to copper wire, coaxial cables, satellite communication channels, optical fiber links, microwave links, or any combination thereof. The term "couple" means an arrangement of media or equipment or both that form a path to facilitate transmission and reception (or both) of signals from one defined origin point to a destination point. A "direct couple" means that there are no intervening systems or equipment existing in the path of the signals that would significantly affect the characteristics of the signals traveling from an origin point to a destination point.

At least two types of information are routed through any of the communication links: signaling information and user information. Signaling information (sometimes referred to as control information) is information generated by equipment of a communication network to establish communication, manage communication and terminate communication for a telephone call or session. Signaling information are typically transmitted in accordance with a communication protocol that may be part of a communication standard recognized by one or more different types of communication networks. For example, when a user device (also referred to as user equipment) operated by a user initiates a telephone call, signals are generated and transmitted by various equipment (of the network) to each other to establish a communication channel (or various paths) through which the user equipment transmits and receive user data, manages the telephone call to facilitate transmission and reception of user data in accordance with a communication standard, and terminates the telephone call when at least one of the parties to the telephone call has operated its user device to indicate a desire to end the telephone call. For example, a user pressing "end" or "end call" on a cellular phone (i.e., a user device or user equipment) or a user going "on hook" on an IP (Internet Protocol) or PSTN (Public Switched Telephone Network) telephone are example of a user terminating an established telephone call.

User information is information (typically in the form of voice, video, text, graphics or any combination thereof), which originates from or is destined to a user device operatively coupled to the communication network. User information, which may also originate from communication network equipment, is conveyed (i.e., transmitted or received or both) over user information channels established for the call or are routed as packets through the network. The established user information channel may be an actual channel comprising various network equipment and communication links forming a path to allow the user information to flow from an origin user device to a destination user device. A separate channel is similarly formed for the conveyance of signaling information associated with the call. The user information channel and signaling information channel are dismantled by network equipment once the established call is terminated. The user information channels and signaling information channels may be formed as circuit-switched communication channels or as packet-switched communication channels.

Continuing with FIG. 1, Alerting Server 102 (hereinafter "Server 102" and "Alerting Server 102" are used interchangeably) may have an antenna 104 with which it uses to communicate with Satellite communication network 120 via wireless communication link 112. For each of the communication networks, representative user devices are shown coupled to such networks via communication links. In particular a legacy telephone 142 is shown coupled to the well-known PSTN (Public Switched Telephone Network) communication network 114 via a communication link 122. IP (Internet Protocol) telephone 140 and laptop computer 138 are shown coupled to the Internet 116 via wireless communication links 124 and 126 respectively. Cellular telephone or user device 134 and pager 136 are coupled to wireless network 118 via wireless communication links 128 and 130 respectively. The terms "wireless networks" and "cellular wireless networks" are used interchangeably herein. Each of the wireless communication links comprises an uplink and a downlink channel. The uplink channels as well as the downlink channels may contain user information channels and signaling channels (the terms "signaling channel" and "signaling information channel" are used interchangeably). It should be noted that the various communication networks may be coupled to each other in various manner, but the coupling between such networks are not shown for ease of reference and description.

Wireless network 118 can be a second generation (2G), third generation (3G), fourth generation (4G) wireless network, or a fourth generation or higher generation LTE wireless communication network, a GSM (Global System for Mobile communication) wireless network, or a UMTS (Universal Mobile Telecommunications System) wireless network. Alternatively, wireless communication network 118 can be any combination of the various types of wireless communication networks mentioned. Also, pager 136 can be coupled to either satellite network 120 via communication link 132 or to wireless network 118 via wireless communication link 130. Legacy telephone 142, IP telephone 140, laptop computer 138, cellular phone 134, and pager 136 are examples of user devices. Pager 136 is a type of user device (as will be described herein below) designed and configured to operate with Server 102 to exchange text information with Server 102 forming at least a portion of the paging system of this disclosure. It will be readily understood that the paging system of this disclosure is not limited to one Alerting Server and one pager device. For ease of explanation and discussion an example of the paging system of this disclosure as described herein below comprises a pager device and an Alerting Server.

In one embodiment of this disclosure, the Alerting Server 102 is able to receive—over user information channels—text messages, or voice messages, or both from user devices (e.g., user device 134) and convert these messages to text messages that complies with a signaling protocol (e.g., USSD (Unstructured Supplementary Service Data) protocol) typically used in wireless communication networks such as GSM cellular wireless networks; the text messages or voice messages received by Alerting Server 102 are referred to as paging requests. A paging request may comprise a text message, or a voice message or a combination of a voice and text message. A paging request once converted to a signaling channel protocol compliant message becomes a paging message; the paging message also contains the telephone number of the calling party. Alerting Server 102 is able to handle text messages or voice messages (i.e., paging requests) from various types of user devices to which it is coupled as shown in FIG. 1. As mentioned, Alerting Server 102 also includes as part of the paging message, the telephone number of the user device paging the pager device, which is typically available as caller id information.

For example, suppose the paging device is cellular telephone 134 and the pager device is as shown—viz., pager device 136. Thus, in paging pager device 136 a user operates user device 134 to dial a telephone number associated with Alert Server 102. Upon being dialed by user device 134, Alert Server 102 interprets the telephone call as an initial step of receiving a page request from user device 134. Alert Server 102 prompts user device 134 (using an IVR (Interactive Voice Response) system or text) to enter a code uniquely associated with the pager device to which user device 134 desires to send a page. After confirming that user device 134 has entered a correct code, i.e., a code that matches a code of a subscriber device, viz., pager device 136, Alert server 102 may further prompt user device 134 to send a brief text or voice message along with the page to pager device 136. Even further, Alert Server 102 may exchange information with user device 134 to confirm the telephone number of user device 134. A proper page request as interpreted by Alert Server 102 comprises a confirmed telephone number of the paging device (i.e., the telephone number of user device 134), correct input of the telephone number of the pager device or correct input of a code associated with the pager device, and any message (received as voice or text format by the Alert server) provided by the paging device when prompted by the Alert Server 102. A page request that is not proper will not be used by Alert Server 102 to page the pager device. An improper page request can be for example, an incorrect code inputted by the user of the paging device. Another example of an improper page request is the Alert Server being unable to confirm the telephone number of the paging device making the page request.

Figure 2:
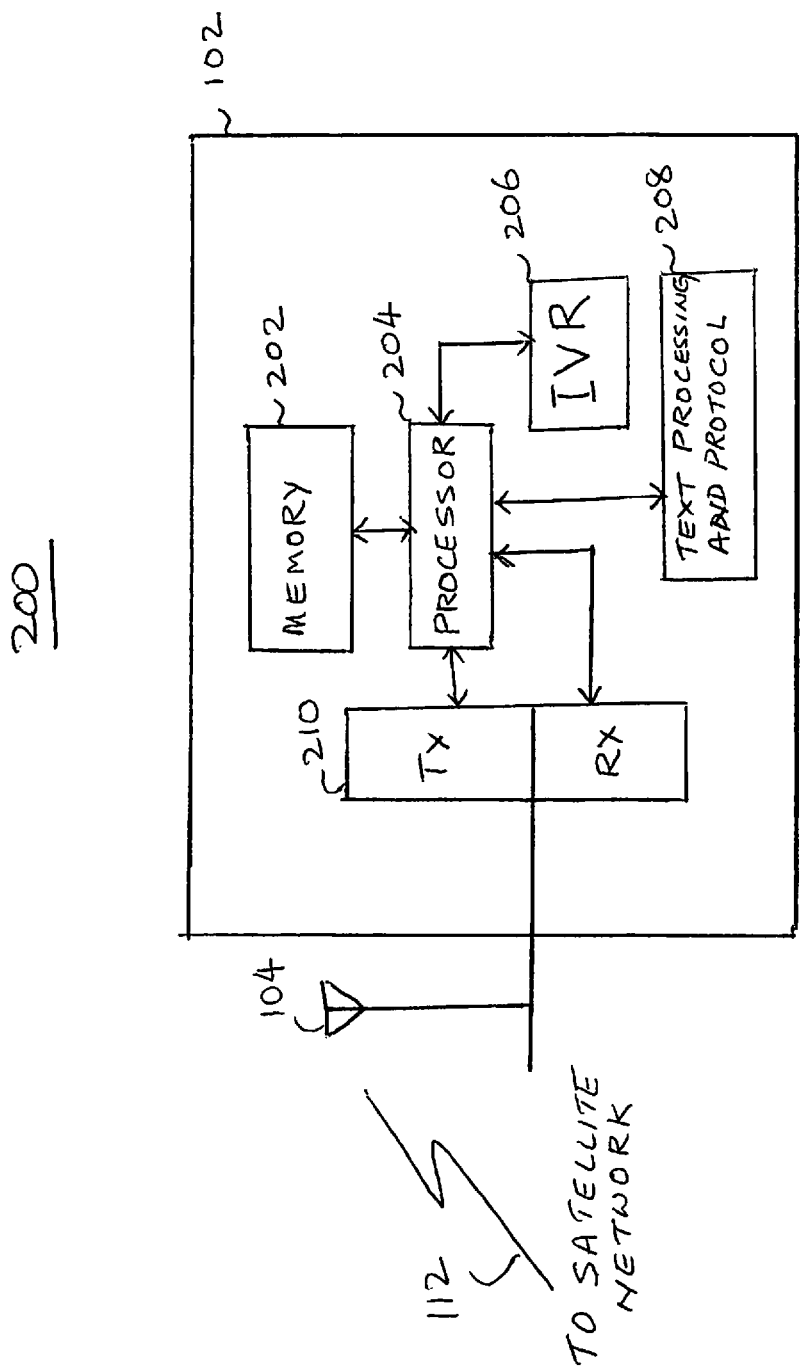
FIG. 2 depicts a block diagram of the Alerting Server shown in FIG. 1.

The Alert Server 102, under the control of processor 204 of FIG. 2, converts the proper page request to a paging message comprising the telephone number of the paging device (i.e., telephone number of user device 134 in our example). The proper page request may also comprise any additional message received by Alert Sever 102 resulting from a prompt by the server 102. The paging message is a text formatted in accordance with the signaling channel protocol of the communication network through which server 102 communicates with the pager device. Regardless of whether the additional message was received in voice form or text form, the resulting paging message will be a text message that complies with a signaling protocol of the communication network through which server 102 communicates with the pager device. The signaling protocol can be the USSD protocol used in GSM networks and other types of networks. Preferably, the signaling protocol may be any protocol (proprietary or not) in which a signaling channel established between the Alerting server and the pager device remains open to allow instant and real time information exchange between the Alerting server (e.g., server 102) and the pager device (e.g., device 136).

Because of the nature of the USSD protocol, the signaling channel (established by the Alerting Server) through which Alert Server 102 transmits the paging message remains an open and working connection allowing instant real time information exchange between Alert Server 102 and pager device 136. The paging message after having been transmitted over the USSD signaling channel by the Alert Server 102 is received by the by the device being paged (i.e., pager device 136) and the paging message is displayed on the pager device. The paging message being displayed may be the telephone number of the user device paging the pager device or a brief audio message (transmitted as a text over the signaling channel) or a text message, which is played or displayed by the pager device repeatedly for a defined time period. Also, the paging message may be both the phone number and a brief audio message or text message.

In another embodiment, another type of protocol—which is a store an forward type of text protocol—can be used in the signaling channel connecting a pager device and the Alerting server of the paging system of the present disclosure; one example of such a protocol is an SMS (Short Message Service) protocol known as SMPP (Short Message Peer to Peer). Communication networks use the SMPP protocol for exchanging SMS messages between an SMSC (SMS Service Center) and short messaging entities or equipment. In such an embodiment, the Alerting Server is connected to an SMSC via a signaling channel that uses the SMPP protocol to exchange user information between the Alerting server and the SMSC. It should be noted that the SMSC may be part of or integrated with the Alert Server.

Upon receipt of the paging message from the Alerting Server, the pager device automatically transmits a contact message over the signaling channel indicating to the Server that the paging message was received. The contact message is a message stored in the memory of the pager device that is used to indicate to the Alert server that a paging message was received. The contact message is retrieved from the memory of the pager device under the control of a processor of the pager device (as will be discussed infra), and is caused to be transmitted by the processor of the pager device. Further, the Alerting server also waits for an affirmative response (i.e., an acknowledgement signal) from the pager device resulting from the user of the pager device operating said device (by keying an acknowledgement button or a sequence of keys on the keypad) to indicate that he/she has received the page and will respond momentarily. If there is no acknowledgement response from the pager device 136 (even when the pager device has already sent a contact message) prior to the expiration of the defined time period, the Alerting server 102 concludes that the user is unavailable and transmits such a message to the user device (e.g., device 134) that transmitted the page request. The message to the user device 134 may be a text or a synthesized voice message via an IVR 206 (see FIG. 2) at the server 102.

It will be readily understood that FIG. 1 shows a particular example of how Alerting Server 102 can be used and thus in no manner limits the usage of Alerting Server 102 in terms of the different types of communication networks with which such a Server can interface or exchange information. Further, FIG. 1 in no manner dictates or limits the number of user devices (paging devices or pager devices) that may communicate with Alerting Server 102 at any particular instant of time or the number of different types of user devices that can communicate with Alerting Server 102 at any instant of time. Different types of user devices are shown in FIG. 1 to facilitate discussion and description of a Paging system comprising Alerting Server 102 and at least one pager device (e.g., user device 136).

Referring now to FIG. 2, a block diagram 200 of Alerting Server 102 is shown. Alerting Server 102 comprises Transmitter and Receiver circuitry 210 for receiving or transmitting (or both) signals from user devices (i.e., pager or paging devices) devices and signals from any one or more of the many communication networks to which the Server 102 may be coupled. It will be understood that the Alerting Server 102 communicates with pager devices of the present disclosure via signaling channels of the communication network(s) to which the Server is coupled. The Alerting server 102 uses paging messages to communicate with such pager devices.

Although not shown in FIG. 2, it will be readily understood that Transmitter and Receiver circuitry 210 also includes amplifiers, filters and other well known processing circuitry for at least voice and text signals, which may represent user information or signaling information being received or transmitted by Alerting Server 102. Transmitter and Receiver 210 has coupled thereto antenna 104 to create a wireless link (e.g., link 112 in FIG. 1) to a Satellite Network, which Server 102 may decide to use when wireless or other networks coupled to Server 102 via wire, optical links, or coaxial links are not accessible through such links. For example, a wireless network that typically is accessed by Alerting Server 102 through an infrastructure of optical and other links may not be accessible via those links for a relatively long period of time. In such cases, Alerting Server 102 may be able to access such wireless networks via a Satellite link that is part of a Satellite Network. Also, Satellite network 120 may be able to provide a direct link between Alerting server 102 and the pager device being paged. It will be understood that the Satellite Network may itself contain the proper communication equipment to process signals from Server 102 and a pager such as pager 136 so as to enable proper protocol based communications between Server 102 and pager 136 as will be described below.

Alerting Server 102 also has a text processing and protocol module 208 for processing incoming or outgoing text signals and formatting such text signals in accordance with the proper protocol(s). Various different text protocols are stored in Text Processing and Protocol module 208 including at least the USSD and SMPP protocols. Other proprietary protocols can also be stored in module 208. Depending on the communication network to which Alerting Server 102 is connected, the Server—using TX/RX circuitry 210—transmits or receives signals (containing user or signaling information). Further, Text Processing and Protocol module 208 applies the proper protocol to communicate with various communication networks. Module 208 may also contain protocols for voice communications that may occur between Server 102 and any one or more of well-known user devices some of which are discussed herein.

Alerting Server 102 further comprises Memory 202 for storing various pre-defined messages, protocols and other data it uses to communicate with user devices and other communication networks in text or voice or both for data or text for signaling information. Memory 202 can also be used to store temporarily incoming and outgoing signaling or data messages or both. Alerting Server 102 further comprises an IVR system 206 that is used to communicate with a paging device during a paging request or to report status of the pager device to an operator of a paging device after a paging request was sent by the paging device. The IVR system 206 is also used to prompt a user of a paging device to enter a unique code associated with the pager device during a paging request by said user.

Also, Alerting Server 102 comprises a Processor 204 that controls the operations of the other components (210, 206, 202, and 208) and their related circuitries. Processor 204 may be one main processor, several processors, a controller, one or more processors or controller combined with one or more digital signal processor, to process data or user information and signaling information between a user device and a pager device designed to operate with Server 102. The various operations of the components of Alerting Server 102 are done under the control of processor 204. Such operations as retrieving information from memory, routing information to be transmitted or routing received information for additional processing or for storage are all done under the control of processor 204.

Figure 3:
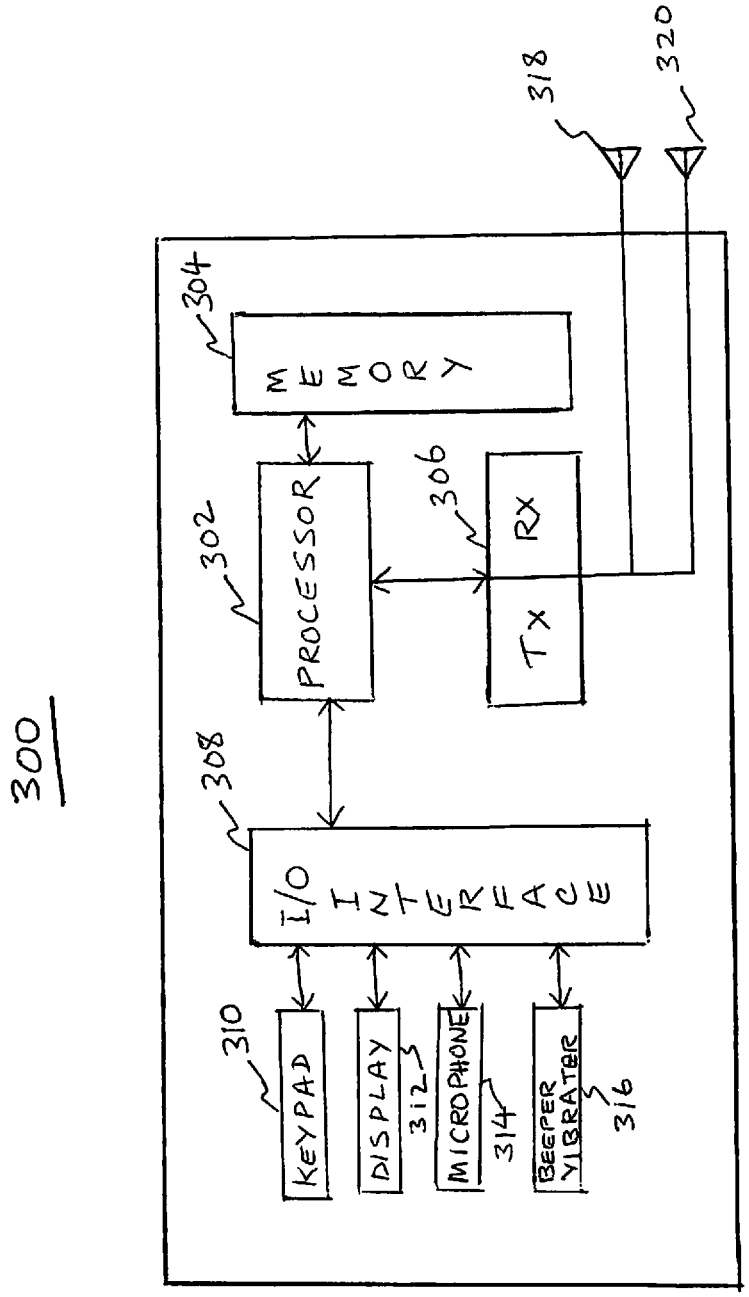
FIG. 3 shows a block diagram of a pager of the paging system of the present disclosure.

Referring now to FIG. 3, a block diagram 300 of another component of the Paging System of this disclosure is shown. In particular, a block diagram of mobile pager device 136 disclosed in FIG. 1 is shown in more detail in FIG. 3. Pager device 136 has two antennas 318 and 320; one antenna 318 is used to communicate with a cellular wireless network (e.g., communication network 118 of FIG. 1) and the other antenna 320 is used to communicate with a Satellite Network (e.g., Satellite Network 120 of FIG. 1). Both antennas 318 and 320 are shown coupled to TX/RX (transmitter and receiver) circuitry 306. TX/RX circuitry 306 has the proper amplifiers, filters and signal processing circuits to handle incoming/outgoing text signals from/to Alerting Server 102 via a cellular wireless communication network (see, for example, network 118 of FIG. 1) or a Satellite Network (see, for example, network 120 of FIG. 1).

Pager device 136 further comprises memory 304, I/O (Input/Output) interface 308 and several user accessible components coupled to I/O interface 308. The user accessible components are keypad 310, display 312, microphone 314 and beeper/vibrator 316. Unlike the other user accessible components, beeper/vibrator 316 is not directly accessible to a user of a pager device, but its operation can be directly controlled by a user through the use of a key on the keypad 310. When device 136 is paged, it can vibrate or a beeper can be caused to generate a beeping sound to alert the user that a page has been received. The user has the ability, through the operation of one or more keys of the keypad 310 or through the manipulation of a switch (not shown) on the surface of pager 136, to cause the pager 136 to send an acknowledgement message (compliant with the signaling protocol being used for the signaling channel between the pager device and Alerting server 102) indicating to the server 102 that he/she has received the page.

In one embodiment of the pager 136, a Microphone 314 is included, which gives the user of the pager 136 the ability to respond verbally to a page request. The user's verbal response is digitized and converted to a short text message by processor 302 and other related circuitry (e.g., D/A converter, sampling circuit, voice filter) and sent back over a signaling channel to Alerting Server 102 (see FIGS. 1 and 2). The Alerting Server 102 can then relay the message in text form or in synthesized voice format to the paging device. The user of the pager device 136 will be limited by the device 136 in the length of time of the verbal response. In one embodiment, the user after selecting to respond to a page using his/her voice, will be given—by the pager—a preset amount of time (say, 10 seconds) to voice his/her response.

All of the components of the pager as shown in FIG. 3 are controlled by processor 302, which may be one main processor, several processors, a controller, one or more processors or controller combined with one or more digital signal processor, to process data or user information and signaling information received from or transmitted to Alert Server 102. As shown, processor 302 is coupled to Memory 304, TX/RX (i.e., Transmit/Receive) circuit 306, and I/O interface 308 through which processor 302 controls the keypad 310, display 312, microphone 314 and beeper/vibrator 316. Processor 302 controls the operations of all components/devices (310, 312, 314, 316, 308, 306, 304, 318, and 320) and their related circuitries. The various operations of the components of pager device 136 are done under the control of processor 302. Such operations as retrieving information from memory, routing information to be transmitted or routing received information for additional processing or for storage are all done under the control of processor 302.

The steps performed by the pager device 136 and Alerting Server 102 during a typical page request is now described so as to explain the operation of the Paging System of the present disclosure. It should first be noted that the owners and/or operators of Alerting Server 102 provide a paging service for individuals who subscribe to the paging service by entering into a subscription agreement with the owner/operators of the Alerting Server 102. Upon entering into a subscription agreement, the subscribers are provided with a pager device 136, and an N-alphanumeric character code or an N-digit code where N is an integer equal to 2 or greater.

The Alerting Server 102, as shown in FIG. 1, is coupled to various types of communication networks. It will be readily understood that regardless of the type of communication network coupled to Alerting Server 102, the Server can be positioned to have access to various gateways, HLRs (Home Location Registers) and VLRs (Visitor Location Register), servers of other communication networks throughout the world. For example, the owners and/or operators of Alerting server 102 can be coupled to the HLR of wireless network 118, which can query HLRs and VLRs throughout the world to locate the subscriber being paged. Presumably, pager device 136—wherever it is currently located—is able to report its presence to the wireless network local to its location and thus the pager's identity information would be stored in the VLR (Visitor Location Register) or HLR of that local network. Once pager 136 is identified by a certain VLR (or HLR), Alerting Server 102 can transmit the page (i.e., the paging message) to pager 136.

Figure 4:
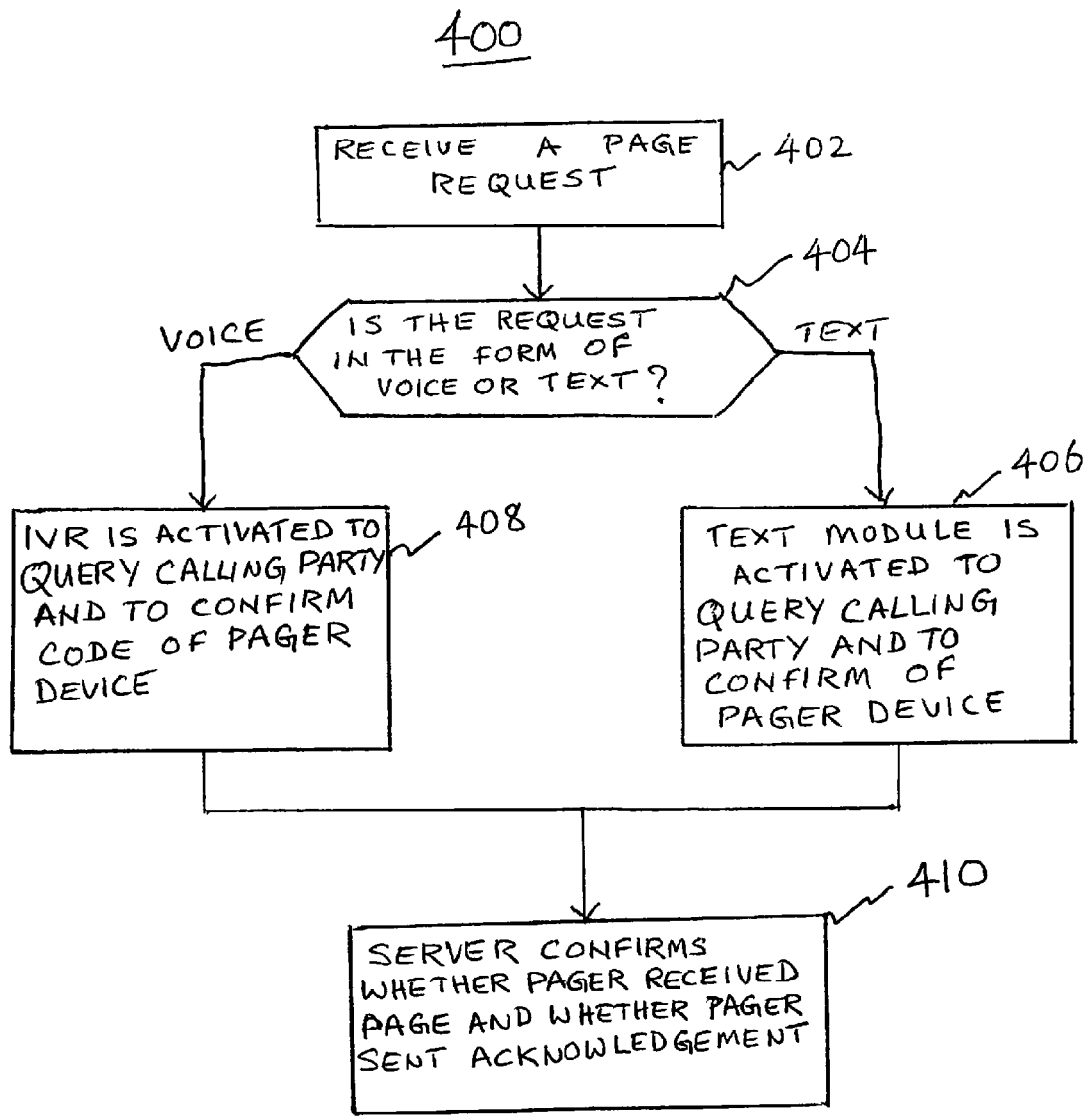
FIG. 4 depicts a flow chart of the method performed by the Alerting Server of FIG. 2.

Referring now to FIG. 4 the method 400 of the Alerting Server is shown in flow chart form. In step 402, the Server 102 receives a call presumably from a calling party desiring to transmit a page request to a subscriber of the paging system of the present disclosure. For the sake of discussion, suppose a wireless mobile 134 (i.e., a cellular phone or other user device such a laptop or a tablet) is paging pager device 136. The user of the pager device 136 would have already entered into a subscription agreement with the owner/operator of the Alerting Server 102. Sever 102 is coupled to a communication hub of a wireless network such as network 118 as shown in FIG. 1. The communication hub of wireless network 118 may be an HLR (Home Location Register), which has access to VLRs and other HLRs of other wireless networks throughout the world. In addition to the block diagram of FIG. 2, Server 102 may operate as a communication switch connected to one or more gateway providing access to many networks. Thus, Alerting Server 102 may have worldwide access to wireless communication networks and other types of networks such as a Satellite network. Additionally, a satellite network such as network 120 in FIG. 1 may provide worldwide access to locate pager device 136 when the communication network to which the pager subscribes to is temporarily not operating.

Further, upon entering into an agreement with the owner/operator of Server 102, the subscriber would have been provided with a main telephone number by which the Server 102 can be accessed and the subscriber would have also been provided with an N-digit or an N-alphanumeric code (N is an integer equal to 2 or greater) that is unique to that subscriber. Presumably, a subscriber would give an acquaintance (who will be a calling party at some point) the main number by which Server 102 can be accessed and the N-digit or N-alphanumeric code. Upon contacting the Server 102 by dialing the main number, the calling party would enter the N-digit code when prompted (by IVR 206 of FIG. 2, for example) by Server 102 as will be discussed herein.

It should be noted that—as will be discussed herein below—Server 102 can be accessed via a telephone line, the Internet, or other access points for either voice communications or text communications. Server 102 may have the same telephone number for both voice or text calls. Alternatively, Server 102 may have a phone number for accessing it using text messages and another phone number for accessing it by voice. Further, Server 102 may be accessed via a website designed and operated by the owners and/or operators of the paging system of this disclosure. At the website a calling party can either "chat" with an operator or can converse (using voice) with an operator or with the IVR system of the Server 102. The IVR is activated automatically when a calling party contacts Server 102 through a voice channel either via a wireless network or a wireline network or the Internet. Thus, the calling party can send a page request via the Internet, or by way of text messages, or even through a voice command prompted and received by the IVR of the Alerting server 102.

If a calling party accesses Server 102 using a text channel, the Server 102 will initially provide the caller the opportunity to communicate via text or through voice communications if the user device of the caller has voice communications capability. Referring temporarily to FIG. 2, server 102 has a Text Processing Protocol module 208 that it uses to process incoming text messages from calling parties wishing to page a subscriber. Text Processing Protocol module 208 also processes text messages exchanged between Server 102 and pager devices such as pager 136. Thus, Server 102 can provide similar services and capabilities as an SMSC (Short Message Service Center) server or a USSD gateway. For example, Server 102 can process text messages—including transmitting and receiving such messages-in accordance with any well-known signaling channel text protocol. In particular, Server 102 can use the SMPP (Short Message Peer to Peer) protocol or USSD protocol to transmit and receive text messages.

Referring back to FIG. 4 and continuing with step 402, Server 102 receives a call (over voice communications line) from a calling party desiring to page a subscriber of the Paging System of the present disclosure. In step 404, Server 102—prior to answering the call—has already determined that the call is over a voice channel and therefore Server 102 activates its IVR 206. If processor 204 (see FIG. 2) of Server 102 determines that the incoming call is over a text channel, processor 204 activates the Text Processing & Protocol module 208 to answer the call and the method of the present disclosure moves to step 406. If the processor determines that the call is a voice call, then the method of the present disclosure for the Server 102 moves to step 408.

In step 408, the IVR greets the calling party and then attempts to confirm the telephone number from which the calling party is calling (i.e., the calling number); that is, the Server 102 confirms that the actual number of the party making the call is indeed the number that appears as caller id information. The Server 102 can confirm the calling number in any one of several manners. For example, the IVR can give the caller a 'confirmation code' and then ask the caller to "hang up," informing the caller that his number will be called and he/she is expected to enter or say the confirmation code when asked. The Server 102 can then call the calling number and the IVR can immediately ask the responding party to enter the confirmation code. The responding party will have three attempts to enter or say the correct confirmation code. If after three attempts, the responding party is still is unable to enter or say the correct confirmation code, the Server will terminate the call and store the calling number (that is, the number appearing from the caller id) as a suspect number (in a 'suspect number list'), which if used again will have to be confirmed in the same or different manner. Therefore, in an alternative embodiment of the present method, in step 408, the Server 102, prior to answering the call, will check its 'suspect number list' after it obtains the phone number of the calling party (from caller id) to see if there is a match. If a match occurs, then the Server 102 will go through a more rigorous confirmation of the calling number.

If, however, the calling number is confirmed, then the IVR of the Server 102 prompts the calling party to enter (using the keypad of the calling party's device) or say the N-digit or N-alphanumeric code of the subscriber the calling party wants to page. The calling party will have three attempts to enter or say the correct code. If after three attempts, the correct code is not entered or said by the calling party, Server 102 will automatically terminate the call and store the calling number in its suspect list.

Also, the pager device may contain a list of confirmed numbers belonging to acquaintances of the user of the pager device. A user of the pager device will immediately recognize a page from such a number because the name of the person associated with the number will appear during the page similar to a contact number on a cellular phone. The pager provides the ability to store names and associated numbers in the pager memory 304. Further, to prevent robot calls, the Alerting server may have an extra layer of protection by requesting the calling party to perform various tasks that may be difficult or impossible for a robot call computer to perform. Such techniques to filter out robot calls are discussed in U.S. Pat. No. 9,031,210, which is incorporated herein by reference in its entirety.

Returning back to step 404, if the Server 102 determines that the incoming call is over a text channel, then the method of the present disclosure moves to step 406. In step 406, the calling party even though calling over a text channel will be given the opportunity to interact with Server 102 using voice instead of text. A first text message will ask the calling party if he/she wants to switch to voice communications. If the calling party answers in the affirmative, then the IVR is activated and goes through a calling number and pager subscriber code confirmation process as described above for the case of voice channel communications in step 408. This is done with the feature of injecting short voice messages over a text channel as is sometimes done in many cellular devices such as smart phones. Otherwise, the user and the Server 102 can communicate via text messages allowing them to go through the confirmation process confirming the calling number and the N-digit or N-alphanumeric code for the subscriber to be paged.

If after step 406 or step 408 as discussed above the calling number and the subscriber N-digit or N-alphanumeric code are confirmed, the method of the present disclosure moves to step 410. At this point a proper paging request has been sent to the pager device.

In step 410, the Server 102 attempts to communicate with the pager device (and hopefully with the subscriber) by dialing the actual number of the pager device 136 and once a call is established, texting the paging message that includes the calling number of the calling party to the pager over a signaling channel that couples the Server 102 with the pager device 136. The paging message may also comprise additional voice or text message that was part of the proper paging request. It is to be noted that in one embodiment of the present invention, only the owners/operators of the Paging System know the actual number of the pager device 136. There may be one or more N-digit or N-alphanumeric codes associated with a pager device, but only the Paging System knows the actual telephone number of the pager device 136.

The Server contacts the pager device via a signaling channel of a wireless communication system using a text protocol such as USSD or SMPP or a proprietary protocol that uses a signaling channel to transmit user information in real time. In some instances, the text signaling channel may not be accessible by the Server 102 and in such cases, the Server 102 uses a Satellite link to establish a signaling channel between it and the pager device; in such a case the pager device and the Server can communicate in accordance with the signaling protocol which is resident in both the Server (module 208 of FIG. 2) and the pager device (Memory 304 of FIG. 3). The server may have stored in its memory various text protocols for signaling channels; the same feature can be designed in the pager device such as pager device 136 whose block diagram is shown by FIG. 3.

The Server 102 has circuitry that allows it to operate as an SMSC using, for example, an SMPP protocol where the SMSC (e.g., the Server 102) attempts to connect to an HLR of a nearby network directly via a text signaling channel or indirectly via a Satellite link(s) (e.g., links 112 and 132 in FIG. 1) and a text signaling channel. The pager device 136 is equipped with an antenna designed for the same satellite network to which the Server 102 has access. Pager device 136 would receive signals from the Satellite network via one of its two antennas (i.e., antenna 320). Even though not shown in FIG. 3, pager device 136 has an ON/OFF switch and thus may be switched OFF. When switched OFF the pager device 136 does not respond to any page, and thus the Server will not get any response from the page. The pager device will not send even a contact message in such a circumstance because it is switched OFF. The pager is designed to time out after a defined period of time. After the time out, the pager will then inform the Alert server via the established signaling channel that a time out has occurred. The pager can inform the Server of such an event by using specific commands designed by the owners and operators of the paging system of the present disclosure.

The Alert Server then informs the calling party (using the IVR or by text as the circumstances warrant) that the subscriber is currently not available and that the calling party can try to page the subscriber at a later time. The Server 102 even when it has successfully engaged with pager device 136 will not confirm that it has successfully paged the device unless the user operates the pager device 136 (for example, pressing an Acknowledgment key) resulting in a acknowledgment text message (using a text signaling protocol such as SMPP or USSD) being transmitted to the Server 102. Alternatively, the pager device can send a very brief voice message (voiced by its user) that is converted into a text stream (by the pager device 136) and transmitted over the signaling channel using the same signaling protocol (i.e., USSD, SMPP or any other acceptable signaling channel text protocol). The pager device 136 contains circuitry to convert a short voice message to its text equivalent which is then sent over the signaling channel in text format in accordance with the text signaling channel protocol being used.

The user of the pager device may choose not to answer the page. In one embodiment of the paging system of the present disclosure, upon displaying the calling party's number, the pager device starts a timer for a defined period of time. If prior to the expiration of the timer, the user of the pager device (i.e., the subscriber) operates one or more keys of the keypad of the pager device to indicate acknowledgement of the page, an acknowledgement message (in text form, for example) is sent over the signaling channel to the Server 102. The Server 102 who can now inform the calling party (using text or using the IVR) that the page has been successful and that the calling party should expect to receive a call from the paged party momentarily. Moreover, in another embodiment of the Paging system of the present disclosure, the subscriber may in addition to (or instead of) sending an acknowledgement, send a very brief voice message (in text form over the signaling channel) intended for the calling party. The pager device can be designed or configured to record voice messages (from its user) that are P seconds or less in length where P is an integer. The actual range or value for P may depend on the actual text signaling protocol being used. The brief voice message can then be sent in text or in voice form to the calling party after the contact message is sent to the calling party.

If the subscriber does not answer the page within the time out period set by the Server 102 (even after the contact message has been sent) or if the pager device 136 is turned OFF, the Server will text or send a voice message to the calling party informing the calling party that it cannot confirm that the page was successful. In such a case, the Server 102 may invite the calling party to try another page at some later time.

It should be noted that any page that the subscriber missed for whatever reason can be answered at some later time by the subscriber. The subscriber can key in his N-digit code followed by the number of the page that he/she missed to inform the Server 102. Upon receiving such a message over the text signaling channel, the Server 102 can send a message to the calling party that an acknowledgment has been received for the page request that he/she sent hours ago or even days ago. All of the pages received by the pager device (in the form of paging messages) are stored as part of the history of the pager device. Each page received is stored and the time of reception is also stored in the pager device. Accordingly, in another embodiment for the Server 102, the Server monitors the text signaling channels to which it is coupled to receive such late acknowledgements from pager devices.

Figure 5:
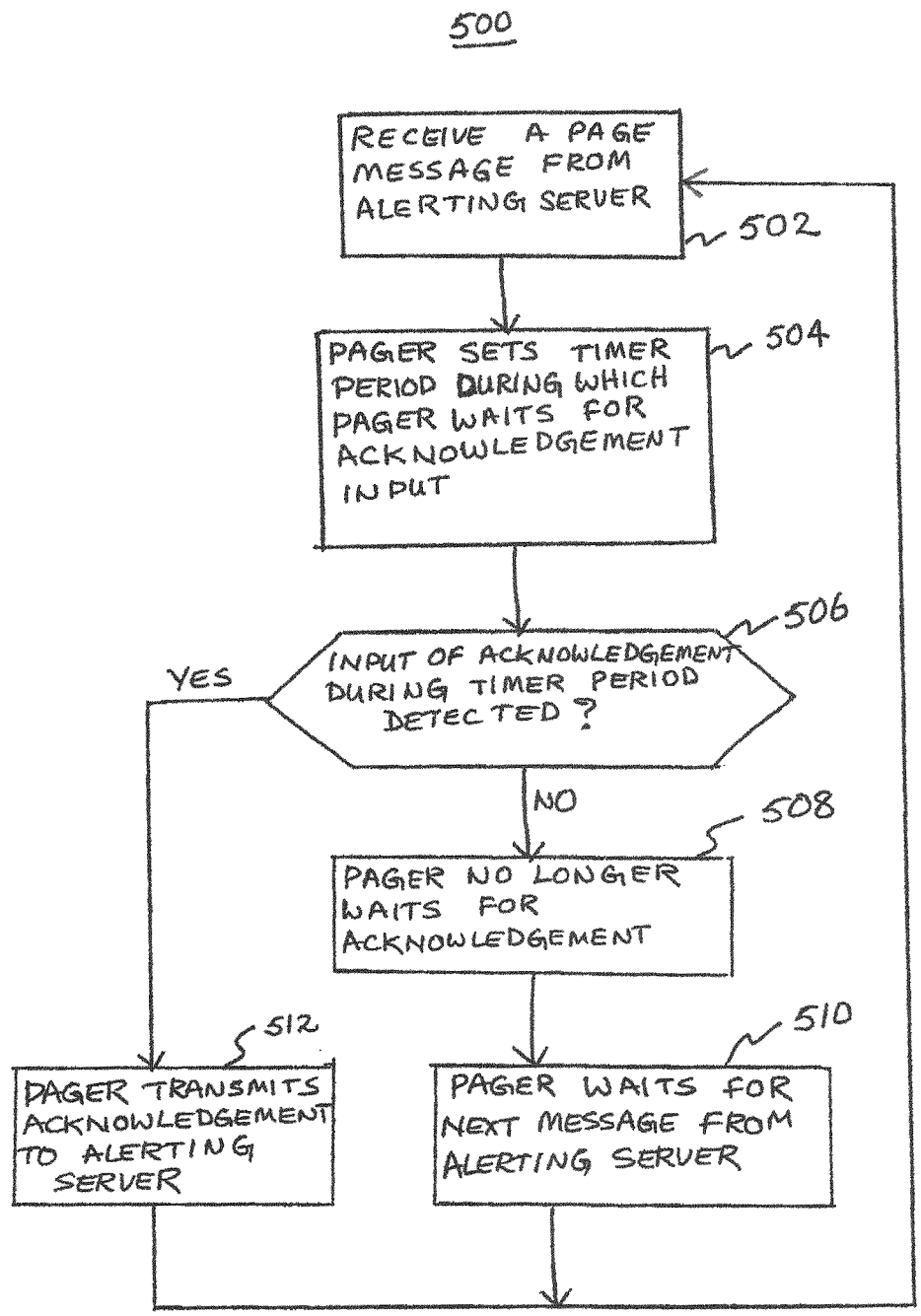
FIG. 5 depicts a flow chart of the method performed by the pager of FIG. 3.

Referring now to FIG. 5, a flow chart 500 representing the operation of a pager device configured and designed for the Paging system of the present disclosure is shown. The pager (e.g., pager 136 of FIG. 3) when turned ON responds to a phone call from Server 102 and in step 502 displays the phone number sent by Server 102 as part of the paging message sent over a signaling channel established by the Server in accordance with the signaling protocol being used by the Server. The telephone number is the number of a calling party and may also be part of a page message that includes additional voice or text information sent by the calling party. The voice information is transmitted in text format and then converted back to voice by pager device 136. Upon displaying the telephone number of the calling party, the pager automatically transmits over the signaling channel a contact message to the server and then moves to step 504. In step 504, the pager sets a timer for a defined period of time during which it expects an acknowledgement message to be keyed in or voice recorded or both by the subscriber or its user.

In step 506, the pager device waits for an acknowledgement to be keyed in by the subscriber before a timer set by the pager expires. It should be noted that at any time the server is not busy transmitting or receiving messages over the signaling channel, it can remotely set the value of the timer by sending a message containing the proper command over the established signaling channel. If the subscriber keys in an acknowledgement prior to the expiration of the timer, the method moves to step 512 where the pager transmits this acknowledgement over the text signaling channel to Server 102. In addition to or instead of transmitting the acknowledgement signal, the subscriber can opt to send a very short voice response of length of at least P seconds, but not longer than P+k seconds where P and k are integers equal to 1 or more. In one embodiment P=5 seconds and k=5 seconds. In such an embodiment the voice message has a range of being at least 5 seconds in length but not greater than 10 seconds.

In the same manner as setting the timer discussed immediately above, the Alerting server can remotely set the values of P and k, which may be integers equal to 2 or greater. If the subscriber does not key in an acknowledgment or does not send a voice response, the Server 102, which is monitoring the signaling channel for an acknowledgement signal, eventually times out and informs the calling party that the subscriber has not been located and invites the calling party to try another page at a later time. In one embodiment, the pager device also sends a time out message to the Alert server indicating that no acknowledgement message was keyed. The pager device, in such a case, moves to step 508 where it no longer waits for an acknowledgement message to be keyed in by the user and moves to step 510 where it waits for the next page from the Server 102.

It will be readily understood that the broadcasting system of the present disclosure is able to perform all of the steps with respect to FIG. 2 for more than one listener, or more than one broadcaster or more than one subscriber at the same time. That is, a plurality of broadcasts may be transmitted to a plurality of listener groups at the same time where each listener group comprises one or more listeners.

The particular embodiments disclosed above are illustrative only, as the disclosed subject matter may be modified and practiced in different but equivalent manners apparent to those skilled in the art having the benefit of the teachings herein. It will be apparent to persons skilled in the relevant art(s) that various changes in form and detail can be made herein without departing from the spirit and scope of the various example embodiments discussed herein. No limitations are intended to the details of construction or design herein shown, other than described in the claims below. It is therefore evident that the particular embodiments disclosed above may be altered or modified and all such variations are considered within the scope of the disclosed subject matter. Thus, this description of various embodiments should not be limited by any of the above-described exemplary embodiments, but should be defined only in accordance with the following claims and their equivalents. Accordingly, the protection sought herein is as set forth in the claims below.

While various aspects of the present disclosure have been described above, it should be understood that they have been presented by way of example and not limitation. It will be apparent to persons skilled in the relevant art(s) that various changes in form and detail can be made therein without departing from the spirit and scope of the present invention. Thus, the present disclosure should not be limited by any of the above-described exemplary aspects, but should be defined only in accordance with the following claims and their equivalents.

In addition, it should be understood that the figures in the attachments, which highlight the structure, methodology, functionality and advantages of this disclosure, are presented for example purposes only. This disclosure is sufficiently flexible and configurable, such that it may be implemented in ways other than that shown in the accompanying figures.

What is claimed is:

1. A server of a paging system, the server comprises:
   a processor;
   transmitter and receiver circuitry coupled to the processor where under the control of the processor a proper paging request received by the receiver circuitry is converted to a paging message comprising a telephone number of a paging device from which the paging request was received, where the processor controls the transmitter to transmit the paging message over a signaling channel of a communication network to which the server is coupled; and
   an IVR system and a text processing and protocol module coupled to and controlled by the processor configured to inform a paging device, using synthesized voice generated by the IVR system or using a text message generated by the processing and protocol module, that in response to the page request an acknowledgement message was received from a pager device indicating a successful page.

2. The server of claim 1 further comprising an antenna coupled to the transmitter and receiver circuitry where said antenna is configured to communicate with a satellite communication network.

3. The server of claim 1 where the text processing and protocol module is coupled to the processor for processing incoming and outgoing text signals and formatting such signals in accordance with a protocol being followed by the signaling channel.

4. The server of claim 1 further comprising a Memory coupled to the processor, the Memory has stored therein pre-defined messages and protocols used by the server to communicate in text or voice with user devices and other communication networks.

5. The server of claim 1 where the IVR system coupled to the processor is used for communicating with a paging device during a paging request.

6. The server of claim 1 where the IVR system coupled to the processor is used to report status of a pager device to a paging device after a paging request was sent by the paging device.

7. The server of claim 1 where the IVR system coupled to the processor is used to generate synthesized voice prompts to direct entry of a code associated with a pager device.

8. A method performed by a server of a paging system, the method comprising
   converting, by a processor of the server, a proper page request received from a paging device to a paging message comprising a telephone number of the paging device, where the processor of the server causes the paging message to be transmitted over a signaling channel of a communication network to which the server is coupled; and
   informing the paging device, using synthesized voice generated by an IVR system of the server or using a text message generated by a text processing and protocol module, that in response to the page request an acknowledgement message was received from a pager device indicating a successful page.

9. The method of claim 8 where the IVR system confirms the telephone number of the paging device generating the page request and confirms correct voice entry of an N-digit code for the pager device, where N is an integer equal to 2 or greater.

10. The method of claim 8 where the text processing and protocol module confirms the telephone number of the paging device generating the page request and confirms correct entry in text format of the N-digit code for the pager device, where N is an integer equal to 2 or greater.

11. The method of claim 8 where the signaling channel operates in accordance with a USSD protocol.

12. The method of claim 8 where the signaling channel operates in accordance with an SMPP protocol.

* * * * *